(12) United States Patent
Lin et al.

(10) Patent No.: US 6,512,864 B1
(45) Date of Patent: Jan. 28, 2003

(54) OPTICAL MULTIPLEXER/DEMULTIPLEXER ARRANGEMENT FOR WDM SIGNALS HAVING IN-BAND AND OUT-OF-BAND SIGNAL COMPONENTS

(75) Inventors: Wenhua Lin, Middletown, NJ (US); Nathan Myron Denkin, Matawan, NJ (US); Tek-Ming Shen, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 98 days.

(21) Appl. No.: 09/590,538

(22) Filed: Jun. 8, 2000

(51) Int. Cl.[7] .................................................. G02B 6/28
(52) U.S. Cl. .............................. 385/24; 385/37; 385/39; 385/43
(58) Field of Search .............................. 385/24, 37, 46, 385/39, 43

(56) References Cited

U.S. PATENT DOCUMENTS

| | | | | |
|---|---|---|---|---|
| 5,483,369 A | * | 1/1996 | Darcie et al. ............ 310/313 R |
| 5,706,377 A | * | 1/1998 | Li ................................. 385/14 |
| 5,841,919 A | * | 11/1998 | Akiba et al. ................... 385/14 |
| 6,069,990 A | * | 5/2000 | Okawa et al. ............... 359/115 |
| 6,205,273 B1 | * | 3/2001 | Chen ........................... 359/130 |
| 6,339,664 B1 | * | 1/2002 | Farjady et al. ................. 385/37 |

* cited by examiner

*Primary Examiner*—Ellen E. Kim
(74) *Attorney, Agent, or Firm*—Troutman Sanders Mays & Valentine (57) ABSTRACT

An integrated wavelength router for use in a wavelength division multiplexing system is disclosed. Input waveguides deliver a plurality of optical signals to a first slab coupler which is in turn coupled to an optical grating waveguide. A second slab coupler is coupled to the output of the optical grating waveguide which is in turn coupled to output waveguides. The input and output waveguides transmit data channels of the wavelength division multiplexing system and include out-of-band signals such as a supervisory signal or a pilot signal with different channel bandwidths. WDM systems utilizing the router of the present invention can reduce power losses and therefore increase the span length of the wavelength division multiplexing system.

38 Claims, 7 Drawing Sheets

OPTICAL MULTIPLEXER/DEMULTIPLEXER ARRANGEMENT FOR WDM SIGNALS HAVING IN-BAND AND OUT-OF-BAND SIGNAL COMPONENTS

FIELD OF THE INVENTION

The present invention relates to the field of optical communications systems and more specifically to the field of wavelength multiplexer/demultiplexers.

BACKGROUND OF THE INVENTION

Optical communication systems use optical signals to convey information over an optical transmission medium, typically a waveguiding medium such as optical fiber. The usable transmission capacity of a given optical waveguiding medium can be substantially increased by the use of wavelength division multiplexing (WDM) techniques. WDM is typically used for long-haul transmission systems but can also be useful for small local area networks. WDM is a method for increasing the capacity of an optical transmission medium by simultaneously operating more than one optical signal at different wavelengths over one medium. With WDM, different multiplexed optical signals can be transmitted at different wavelengths, referred to as channel wavelengths, through the same transmission medium.

One method of routing, switching, multiplexing, and demultiplexing optical signals in a WDM system is to utilize an interconnection apparatus having closely spaced input waveguide ports communicating with the input of a circular-shaped slab coupler. The output of the slab coupler communicates with an optical grating comprising a series of optical waveguides, each of the waveguides differing in length by a predetermined fixed amount with respect to its nearest neighbor. The grating waveguides are connected to the input of a second slab coupler, the outputs of which form the output ports of the routing, switching, multiplexing and demultiplexing apparatus.

A plurality of separate and distinct wavelengths each launched into a separate and distinct input port of the apparatus will all combine and appear on a predetermined one of the output ports. In this manner, the apparatus performs a multiplexing function. The same apparatus may also perform a demultiplexing function. In this situation, a plurality of input wavelengths is directed to a predetermined one of the input ports of the apparatus. Each of the input wavelengths is separated from the others and directed to a predetermined one of the output ports of the apparatus. An appropriate selection of input wavelengths also permits routing between any selected input port to any selected output port.

By multiplexing optical signals at a transmission point of a WDM system and demultiplexing the optical signals at a reception point, the capacity of the physical transmission medium is increased. However, along with the increase in capacity, physical network element management capability is required to ensure the stability and reliability of the network and network elements such as optical amplifiers, multiplexers, demultiplexers, wavelength adds, wavelength drops and wavelength cross-connects. Typically, out-of-band signals (optical signals that are not within the wavelengths used to carry data signals within the WDM system) are used to administer information among the network elements (for example, optical amplifiers, multiplexers, demultiplexers, wavelength adds, wavelength drops and wavelength cross-connects) in a conventional WDM system.

These out-of-band signals can be, for example, a supervisory signal, for monitoring and assuring reliable network efficiency, or a pilot signal, for maintaining the total power transmission levels in a network and compensating for any loss of power.

A conventional router in a WDM system is used to demultiplex/multiplex the precise WDM wavelengths, with WDM channels typically spaced apart in 100 GHz or 50 GHz in frequency increments. The lasers for the channels are typically stabilized with wavelength drift of the order of 1 GHz. In the example of an out-of-band signal such as a supervisory signal (SUPV), whenever a fault is detected by the supervisory system, various parts of the transmission system switch to standby equipment or other necessary fault recovery techniques. SUPV signals typically are transmitted over service channel fibers and therefore allow the full capacity of the primary network to be used for data transmission. This supervisory control provides efficient and reliable network management. In accordance, the International Telecommunications Union (ITU) has proposed the use of supervisory signals along supervisory channel wavelengths for C-band WDM systems, with wavelengths reserved outside the data channel bands. The ITU recommendation for such out-of-band wavelength is 1510 nm (plus or minus 10 nm). Typical stability requirements for SUPV lasers are less than 100 GHz drift. As WDM systems move into L-Band, some proposed wavelengths for SUPV are 1480 or 1624 nm with 100 GHz drift.

A conventional technique to support SUPV or any out-of-band signal in a WDM system is to use two separate filters. One filter, typically an optical bandpass filter, is necessary for adding the SUPV signal into the transmission medium such as optical fiber and another filter is necessary for eliminating the SUPV signals before the WDM signals are transmitted into the network elements. However, extra power losses from the additional SUPV filters can impose a power penalty on the WDM system and consequently result in transmission distance reduction in existing WDM systems.

Accordingly, there is a need for more efficient power transmission between the input and output ports of a WDM system. There is a further need for supporting SUPV and other out-of-band signals in a WDM system without the corresponding power loss and transmission distance reduction found in conventional WDM systems.

SUMMARY OF THE INVENTION

The present invention is an integrated wavelength router which incorporates out-of-band optical signals that can be used in network management for increasing transmission distance or span length. Elimination of bandpass filters, otherwise used to remove out-of-band signals in conventional wavelength routers, allows for additional insertion power losses to be reduced and consequently can increase the span length of the WDM system.

In an exemplary embodiment of the invention, planar waveguide routers (WGR) which can incorporate out-of-band signals such as the supervisory signal by proper control of the free-spectral-range (FSR) periodic property of the WGR device are demonstrated. The incorporated out-of-band signal is combined into the same input ports on the WGR as that for WDM data signals at the transmission point of the WDM system and another output port on the WGR at the reception point of the WDM system. The demonstrated WGR can be used at any point in the WDM system as a network element (for example, multiplexer, demultiplexer, wavelength add, wavelength drop, wavelength cross-connect, etc.).

BRIEF DESCRIPTION OF THE DRAWINGS

A more complete understanding of the present invention may be obtained by considering the following description in conjunction with the drawings in which.

DETAILED DESCRIPTION

Figure 1:
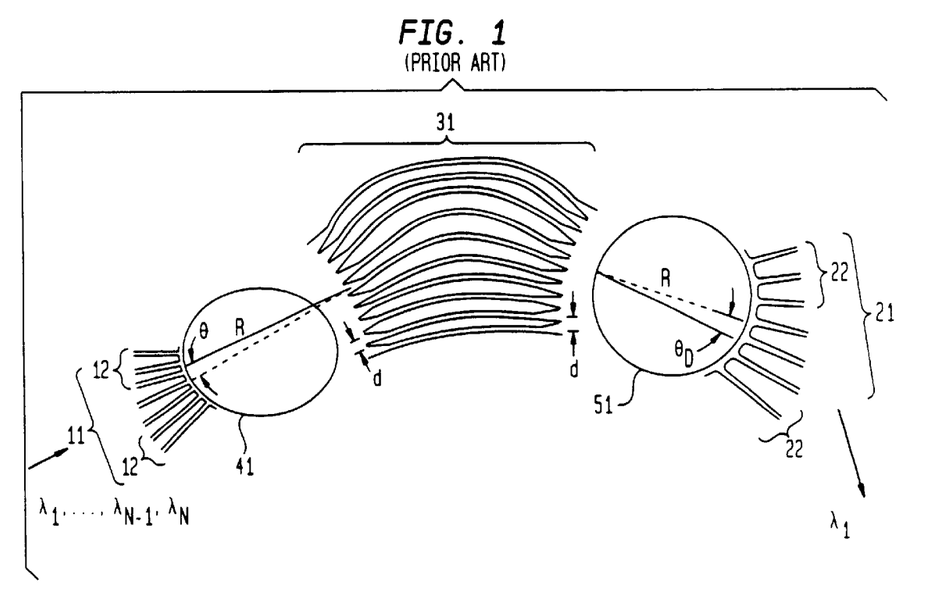
FIG. 1 is a schematic diagram of a conventional planar waveguide router (WGR) in use in a wavelength division multiplexing (WDM) system.

Referring to FIG. 1 there is shown a prior art planar waveguide router (WGR) in use with a wavelength division multiplexing (WDM) system. One example of a waveguide router is disclosed in U.S. Pat. No. 5,002,350 to Dragone issued on Mar. 26, 1991 which is fully incorporated herein by reference. The conventional WGR comprises a first slab coupler 41 comprised of dielectric material which is substantially circular in shape. Input waveguides 11 are radially coupled along an arc of the slab coupler 41 in a substantially uniform fashion each characterized by an angle $\theta_i$ from an axis formed by the center input waveguide. Input waveguides 11 include dummy channels 12 for Vernier tuning for WDM data signals. Optical grating waveguides 31 are coupled along an opposite arc of the slab coupler. The length of each guide in the grating differs from each of the other guides in the grating so that predetermined phase shifts are applied to optical signals propagating in the grating waveguides. The optical grating waveguides are each separated by a distance d from an adjacent waveguide. The opposite ends of the optical grating waveguides 31 are radially coupled to a second slab coupler 51. Second slab coupler 51 is substantially similar to the first slab coupler 41 and is also substantially circular in shape and composed of dielectric material. Along an opposite arc of the second slab coupler 51 are output waveguides 21 radially coupled and characterized by an angle $\theta_o$ from an axis forthed by the center output waveguide. Output waveguides 21 include dummy channels 22 for Vernier tuning of WDM data signals.

In a typical N-channel WDM system, there are N input optical signals assigned individually to N input waveguides 11. As shown in FIG. 1, each of the N optical signals are assigned to a unique wavelength $\lambda_i$ where i=1 to N. The optical signals from the input waveguides are transmitted into the first slab coupler 41 which is characterized by a distance R measured diametrically across the slab coupler. If optical power at a particular wavelength $\lambda_i$ is input to a particular input waveguide, the optical power spreads across the first slab coupler 41 and is distributed to the optical grating waveguides so that portions of the input optical power travel through each of N optical grating waveguides. The spread optical power propagates through the individual waveguides and experiences a constant and wavelength-dependent phase shift caused by the path difference. By utilizing the second slab coupler at the output waveguides in a similar way, one can select a specific output waveguide for optical power by specific choice of input wavelength.

Figure 2A:
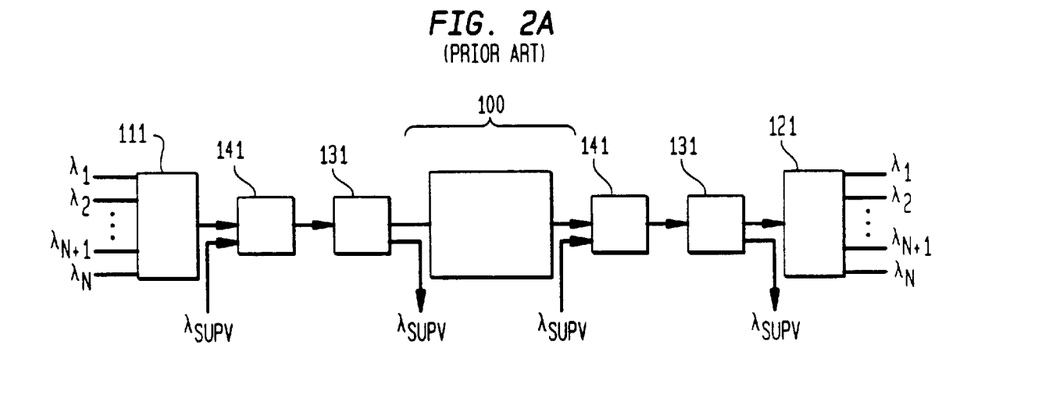
FIG. 2(a) is a schematic block diagram of a conventional WGR in use with a WDM system with a supervisory signal.

Referring to FIG. 2(a) there is shown a high-level schematic block diagram of a prior art implementation of WGR devices used as the network elements in an N-channel WDM system. The WGR device can be used as an N-channel multiplexer, an N-channel demultiplexer and as wavelength add units and wavelength drop units. In the exemplary embodiment, a supervisory signal is used as an out-of-band signal for the supervisory system. It should be noted that implementations for other out-of-band signals will be apparent to one of ordinary skill in the art.

Referring to FIG. 2(a), there are shown input optical signals at different wavelengths $\lambda_l$ to $\lambda_N$ coupled into an optical multiplexer 111. The output from the optical multiplexer is coupled to a wavelength add filter 141 where a supervisory signal is added to the signal after the multiplexer 111. The combined signals (WDM data signals and the supervisory signal) propagate over a transmission medium such as an optical fiber for large span distances. Before the combined signals reach the next network element, the combined signal is then coupled into a wavelength drop filter 131 where the supervisory signal is dropped from the transmitted signal. The signal is then input into a network element 100. Network element 100 can be, for example, an optical amplifier, a multiplexer, a demultiplexer, a wavelength add, a wavelength drop or a wavelength cross-connect. To isolate the SUPV wavelength channels or any other out-of-band signal wavelengths from the optical network elements, SUPV filters are needed to add and drop the SUPV signals at the appropriate points. SUPV filters could be, for example, bandpass filters which can filter out certain bands of wavelengths and allow other wavelengths to pass.

After the WDM signal passes through the network element 100, the WDM signal is coupled into a wavelength add filter 141 where a supervisory signal is added to the WDM signal. The combined signals (WDM data signals and the supervisory signal) propagate over a transmission medium such as optical fiber for large span distances. Before being further coupled into an optical demultiplexer 121, the supervisory signal is again dropped by a supervisory drop filter 131.

Figure 2B:
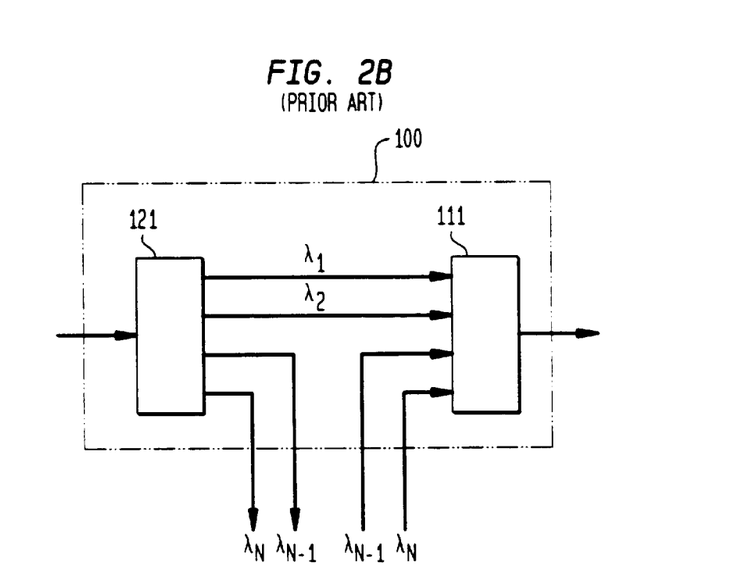
FIG. 2(b) is a detailed schematic diagram of a conventional WGR in use with a WDM system configured as a wavelength add/drop site.

Referring to FIG. 2(b), there is shown a detailed schematic diagram of network element 100 configured as a wavelength add/drop site. Network element 100 includes a demultiplexer 121 coupled to a multiplexer 111. A transmitted signal consisting of multiplexed wavelengths is input to the demultiplexer 121. The demultiplexer 121 subsequently divides the transmitted signal into a plurality of wavelength channels. Certain wavelengths can subsequently be dropped and certain wavelengths can be added at the input to the multiplexer 111.

The insertion loss at a SUPV filter is typically on the order of 1.0 dB at each filter. As can be seen, SUPV filters are needed at the transmitting and receiving points to add and drop the SUPV signals. Therefore, at every wavelength add/drop (WAD) network element, typically 2 dB loss of power can be expected from the add and drop filters. Similar power losses can be expected at other filters to add and drop other out-of-band signals.

Figure 3:
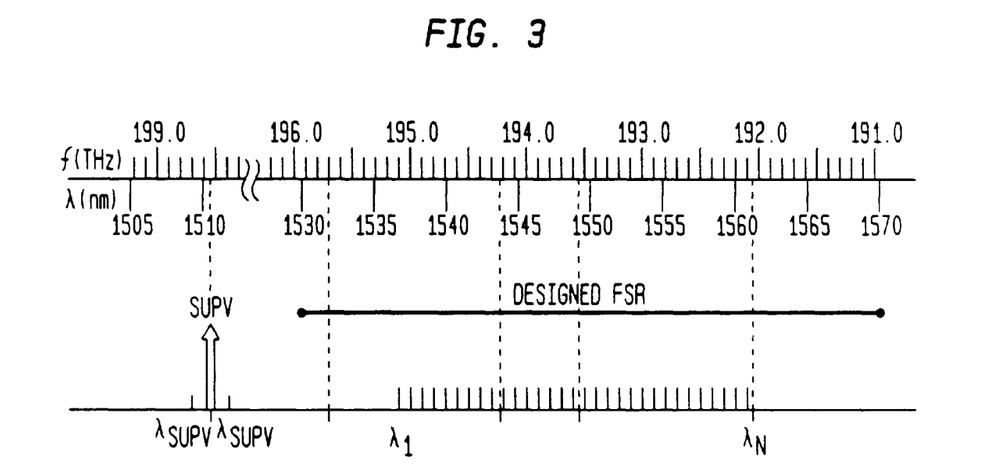
FIG. 3 is a graphic diagram of the wavelength allocation or wavelength comb for C-band WDM systems.

Referring to FIG. 3, there is shown a graphic diagram of the wavelength allocation or wavelength comb for C-band WDM systems. As can be seen, the SUPV wavelength $\lambda_{SUPV}$ and its drift range ($\lambda_{SUPV-}$–$\lambda_{SUPV+}$) are outside the requirements for the data channel bands for the N WDM channels ($\lambda_1$–$\lambda_N$). Although the figure shows designed SUPV wavelength ranges outside the requirements for the designed free spectral range (FSR) of the WGR, it should be noted that the SUPV wavelength range can also be inside the designed FSR.

Figure 4:
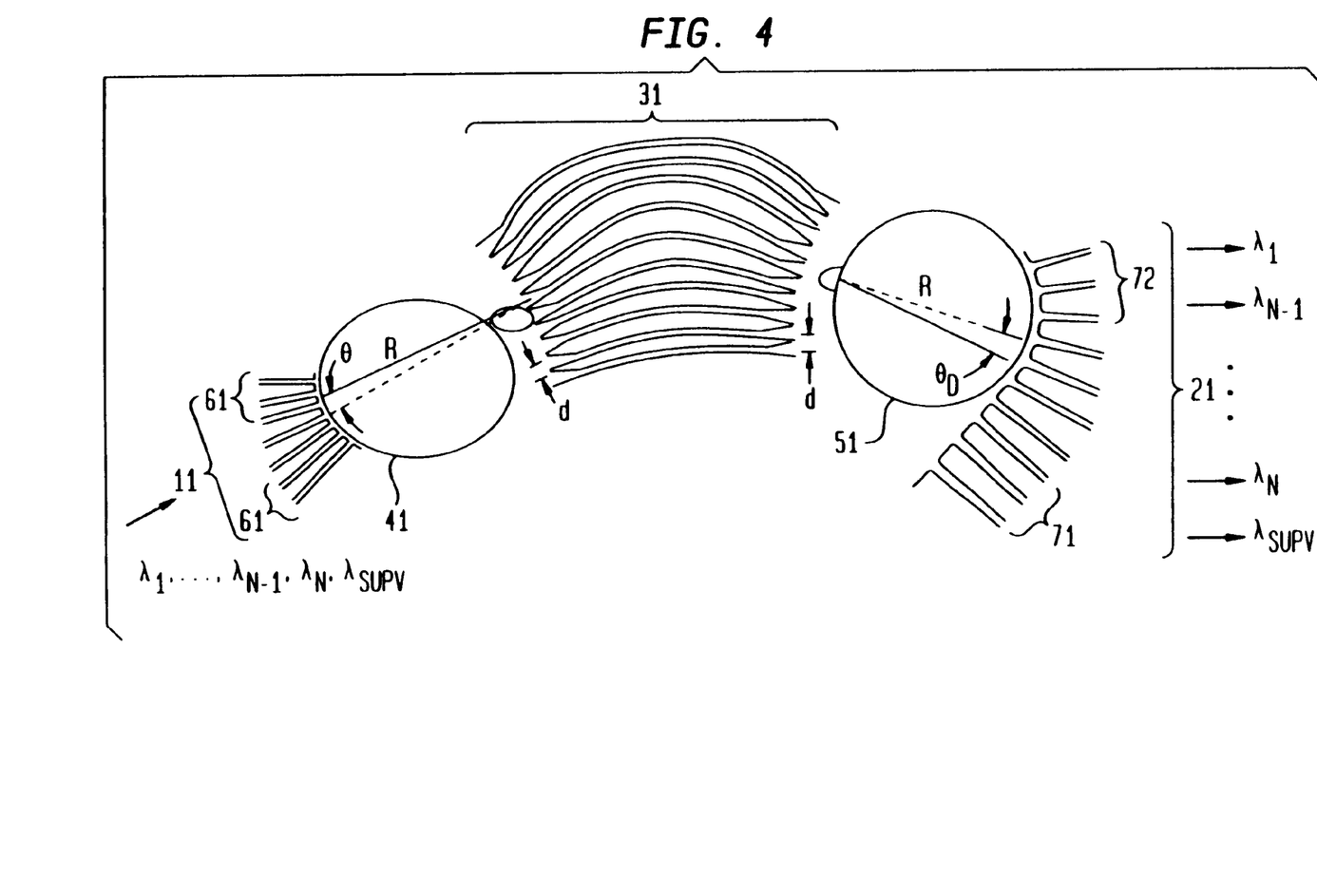
FIG. 4 is a schematic diagram of a planar waveguide router in accordance with the present invention.

Referring to FIG. 4, there is shown a schematic diagram of a WGR in accordance with the principles of the present invention. Like elements to the prior art system are described with like reference numbers in FIG. 4 where possible. The system as illustrated in FIG. 4 can be used as a router, multiplexer or demultiplexer within a WDM system. The planar waveguide router of the present invention comprises a first slab coupler 41 comprised of dielectric material which is substantially circular in shape. Input waveguides 11 are radially coupled along an arc of the slab coupler 41 in a substantially uniform fashion characterized by an angle $\theta_i$ from an axis formed by the center input waveguide. Input waveguides 11 additionally include input ports 61 assigned to dummy channels which will be described in more detail below. Importantly, the optical signals coupled into the input waveguides 11 include data signals $\lambda_1$ to $\lambda_N$ along with the supervisory signal $\lambda_{SUPV}$. Along an opposite arc of the first slab coupler are optical grating waveguides 31 which are also radially coupled. The length of each guide in the grating differs from each of the other guides in the grating so that predetermined phase shifts are applied to optical signals propagating in the grating waveguides. The opposite ends of the optical grating waveguides 31 are radially coupled to a second slab coupler 51. Second slab coupler 51 is substantially similar to the first slab coupler 41 and is also substantially circular in shape and composed of dielectric material. Along an opposite arc of the second slab coupler 51 are output waveguides 21 radially coupled to the second slab coupler 51. Each output waveguide 21 forms an angle $\theta_o$ from an axis formed from the center output waveguide. The output waveguides additionally include output ports 71 and 72 assigned to dummy channels which will be described in detail below. Two sets of dummy channels are necessary, one for in-band WDM data signals and one for out-of-band signals. The first and second slab couplers are characterized by a distance R diametrically measured across the slab coupler. The distance between the centers of two adjacent optical grating waveguides is denoted by d.

Referring again to FIG. 4, light with a plurality of wavelengths is transmitted into the input waveguides 11 and diffracts in the slab coupler region. Each wavelength propagates through the optical grating waveguides 31 and experiences a constant and wavelength-dependent phase shift caused by the path difference. Therefore, the phase shift produces a wavefront tilting so that light convergence in the output slab waveguide is wavelength dependent. Since every output waveguide is arranged on a circle with radius R/2 and is directed at the center of the output array waveguides, the different wavelength channels in the input light are focused along the focal plane of the slab coupler 51 and couple into different output waveguides 21 and 71. The spatial dispersion of the wavelengths is given by the equation:

$$dx/d\lambda = Rmn_g/n_s d n_c$$

where $n_s$ and $n_c$ are the effective refractive index of the slab and grating waveguides respectively, and d is the grating pitch and m is an integer representing the diffraction order. The group refractive index $n_g$ is defined according to the equation:

$$n_g = n_c - \lambda \cdot dn_c/d\lambda$$

Since the optical grating waveguides 31 provide linear dispersion in the wavelength along the focal plane of the slab coupler, WDM wavelengths are demultiplexed by $dx/d\lambda \cdot (\lambda_i - \lambda_0)$ along the focal plane, where $\lambda_0$ is the center wavelength of the WGR and i=1, 2, . . . N. SUPV wavelengths are similarly focused by $dx/d\lambda \cdot (\lambda_{SUPV} - \lambda_0)$ along the focal plane.

The WGR may contain different input and output angles (for example, $\Delta\theta_i$ is not equal to $\Delta\theta_o$) which means that asymmetrical input output port design will yield different demultiplexed wavelengths when a signal is input from different input ports and outputs from different output ports. Under this design, the center wavelength of a WGR device can be adjusted by inputting the multiplexed signal at an off-center port. This is referred to as the Vernier effect. The proper input and output port angular ratio and the number of dummy input ports and dummy output ports can be chosen to compensate the center wavelength offset due to material and processing variation. Therefore, the entire wavelength comb (as shown, for example, in FIG. 3) adapts to processing variations through the Vernier effect. When the multiplexed signal is input at the i-th port, the demultiplexed wavelength at the j-th port is given by the equation:

$$\lambda_{i \to j} = \lambda_0 + (i + (j/R_v))\Delta\lambda$$

wherein $R_v$ is defined as the Vernier ratio between the two angular separations at the output port and input port by $R_v = \Delta\theta_o/\Delta\theta_i$. $\Delta\lambda$ is the channel spacing for WDM in-band data signals. When the output port j=−i, the center wavelength can be shifted by the equation:

$$\Delta\lambda_o = i(1 - (1/R_v))\Delta\lambda$$

Therefore, the WDM channel spacing $\Delta\lambda_o$ remains unchanged but the center wavelength and the wavelength comb are tuned based on the designed $R_v$.

The Vernier tuning principle can be similarly applied to the SUPV wavelength or any other out-of-band signal wavelength. The same amount of dummy channels are designed for the SUPV wavelengths to compensate for device processing variations. When the multiplexed signal with the SUPV wavelength is input at the i-th port, the demultiplexed wavelength is given by the following equation:

$$\lambda'_{SUPV} = \lambda_{SUPV} + i(1 - (1/R_v))\Delta\lambda$$

Therefore, the same amount of additional output channels for SUPV wavelength are necessary for accommodating the Vernier effect. The angular spacing between the additional SUPV channels is the same as the angular values for the additional output channels. Typically, the drift for the laser SUPV wavelength is less than 100 GHz. If the SUPV laser wavelength and its drift are known, the corresponding mode width of the waveguide collector can be designed. It will be apparent to one of ordinary skill in the art to implement other out-of-band signals within the system described.

The design of the waveguide collector of the present invention is to have a widened width for the SUPV channels to accommodate the possible drift of the SUPV signals. The width of the waveguide collector can be modified using a tapered waveguide to reduce power losses. The taper length and width can be further modified (for example, exponential or linear taper) to minimize the mode coupling loss between the input-image beam and the tapered waveguide collector.

Figure 5:
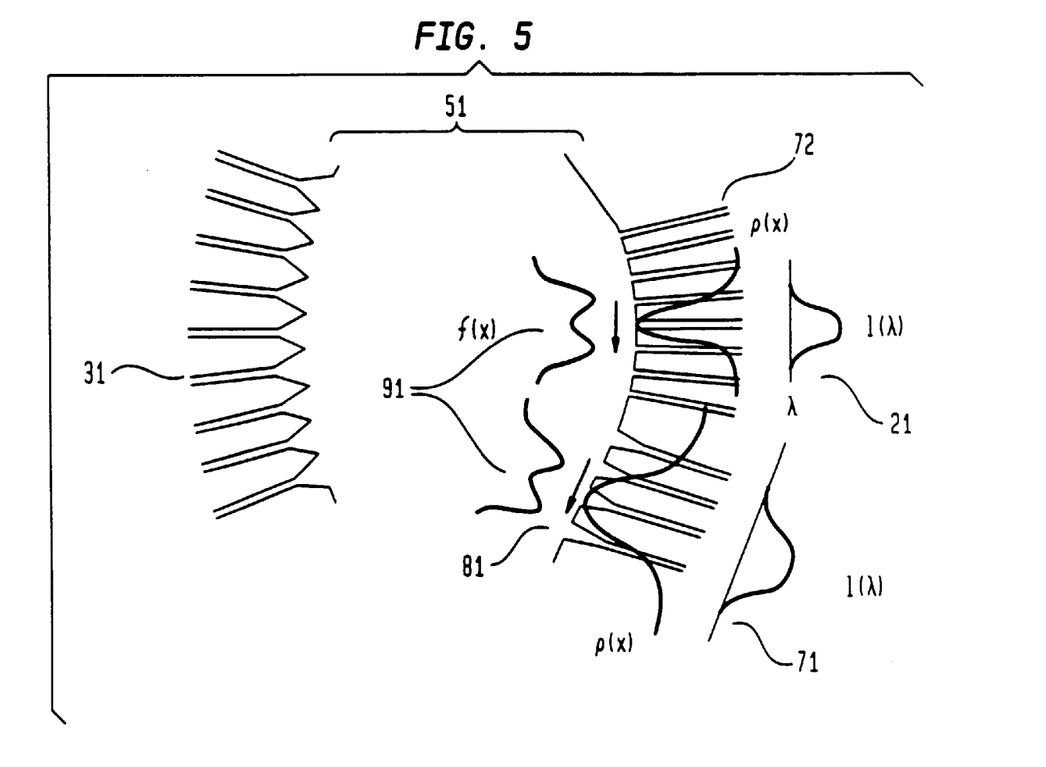
FIG. 5 is a schematic diagram of a detailed implementation of the output waveguides in accordance with the principles of the present invention.

Referring to FIG. 5, there is shown a detailed implementation of the output waveguides in accordance with the principles of the present invention. Additional output waveguides 71 and 72 for demultiplexing the broad out-of-band signal are shown for proper Vernier tuning. It should be noted that modifications are possible for designing with a wide and flat passband response to account for broad band signal drift. The grating waveguides 31 provide linear dispersion in the wavelength along the focal plane 81 of the slab coupler 51. WDM data signal wavelengths are multiplexed by $dx/d\lambda \cdot (\lambda_N - \lambda_I)$ along the focal plane where $\lambda_N < \lambda_I$. Broad out-of-band wavelengths are additionally focused by $\lambda_B \cdot dx/d\lambda$ along the focal plane where $\lambda_B$ is the wavelength of the out-of-band signal and is typically a broad band signal. In this example, the assumption is made that $\lambda_B$ is in the short wavelength range—that is, $\lambda_B < \lambda_I$. However, $\lambda_B$ can also be in the long wavelength range, where $\lambda_B > \lambda_I$. For the case of $\lambda_B < \lambda_I$, the spatial spacing between the WDM data bands and the broad out-of-band channels is $dx/d\lambda \cdot (\lambda_I - \lambda_B)$.

The drift for the laser wavelength for the out-of-band signal such as a supervisory signal is typically about 100 GHz. The wider spectral response for the broad out-of-band signal wavelength is necessary compared to the tight drift for the data channel wavelengths. To accommodate the drift of the out-of-band signals, a waveguide collector using either a multimode waveguide structure or a tapered waveguide structure is implemented 73. Compared to a single mode waveguide, the multimode waveguide and the tapered waveguide have a wider mode size and consequently are bigger waveguide collectors.

At the input to the WGR, multimode interference couplers can be used to widen the bandwidth for both WDM data channels and out-of-band signals. Referring back to FIG. 6, there is shown a detailed schematic of the input to the multimode interference coupler of the present invention. The optical grating waveguides 31 form a double-hump field $f(x)$ 91 which overlaps with the single mode $\rho(x)$ in the output waveguide to form flat top wavelength response $I(\lambda)$ in the wavelength domain. For a conventional WGR device, $I(\lambda)$ for WDM data signals, transferring from the spatial domain to the wavelength domain, can be expressed in the following equation:

$$I(\lambda - \lambda_0) = d\lambda/dx (\int f(x) \cdot \rho(x) dx)^2$$

where $d\lambda/dx$ is the wavelength dispersion along the line of the focused image and $\lambda_0$ is the wavelength of the peak transmission.

For the router of the present invention, when the double-humped input field $f(x)$ is coupled with the wider mode $\rho'(x)$ of the out-of-band signals in multi-mode or tapered waveguides, a widened and flat top response $I'(\lambda)$ in the wavelength domain is formed according to the following equation:

$$I'(\lambda - \lambda_B) = d\lambda/dx (\int f(x) \cdot \rho'(x) dx)^2$$

The taper width and length can be modified on the tapered output waveguides so that mode overlap losses are minimized and transition losses between the input image beam and the multimode or tapered waveguide collector can be minimized. The passband channels for both the WDM data channels and the out-of-band channels have increased insertion losses (typically less than 3 dB) due to modal overlap losses. The increased losses for broad band channels are not so critical for any supervisory or monitoring channels. The relative flatness of the spectral band (or the passband ripple) for the broad out-of-band signal is not critical since the signal usually serves a supervisory or monitoring function.

Since a WGR has free spectral range periodic (FSR) property, a special design is necessary to ensure that the SUPV wavelength does not interfere with the WDM data channels. To ensure that SUPV wavelength does not overlap with the WDM data channels, one must ensure that the following equation holds true when $\lambda_{SUPV} < \lambda_I$:

$$FSR > \lambda_N - \lambda_{SUPV-} \geq \lambda_N - \lambda_I$$

where $\lambda_{SUPV-}$ is the lowest drift of the SUPV channel and $\lambda_N$ is the high end of the WDM data channel. A similar condition applies when $\lambda_{SUPV} > \lambda_N$. For example, currently WDM data channels are located in the range of 1530 nm to 1560 nm. The SUPV channel is located at 1510 nm±0.8 nm (corresponding to approximately 100 GHz wavelength drift). As can be seen, this gives an FSR of at least 50 nm.

The advantages of this implementation of a WGR device is that any additional filters which are necessary to filter out the out-of-band signals are unnecessary. SUPV channels, or any other out-of-band channels, can be passed through the network element rather than being filtered out as in conventional WGR designs. In turn, this results in less power losses and increased transmission distances within WDM systems.

Figure 6A:
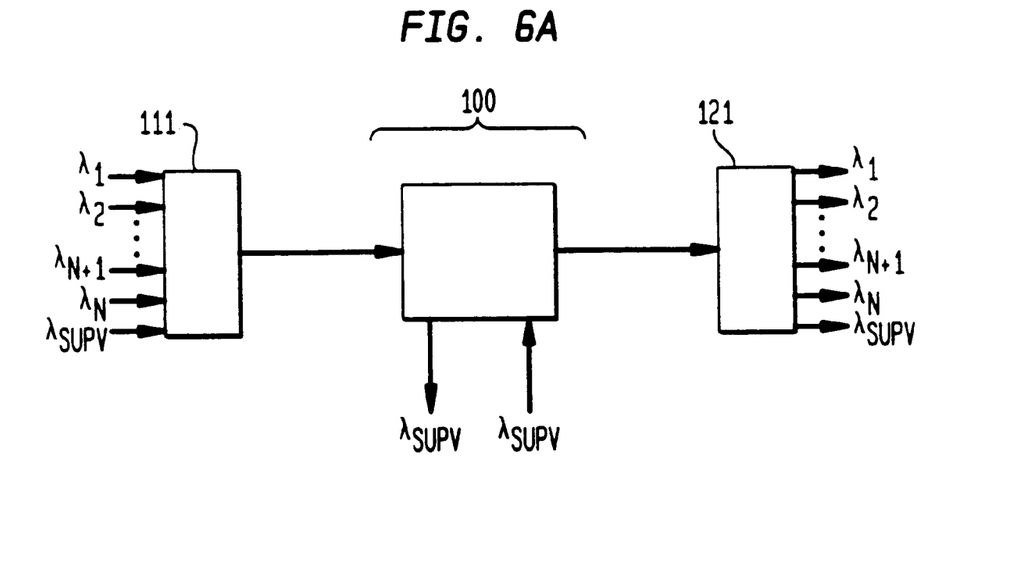
FIG. 6(a) is a schematic block diagram of a WGR of the present invention in use with a WDM system with a supervisory signal.

Referring to FIG. 6(a), there is shown an exemplary embodiment of the present invention in a WDM system used as a network element. There are shown input optical signals at different wavelengths $\lambda_I$ to $\lambda_N$ and supervisory signal $\lambda_{SUPV}$ coupled into an optical multiplexer 111. The combined signals (WDM data signals and the supervisory signal) propagate over a transmission medium such as an optical fiber for large span distances and subsequently input to a network element 100. After the network element 100, the combined signals are directly coupled into a demultiplexer 121. Supervisory signals can additionally be directly added to the network element 100 or may be dropped from the network element 100. SUPV filters coupled between the multiplexer 111 and the network element 100 and coupled between network element 100 and demultiplexer 121 are not necessary in the invention.

Figure 6B:
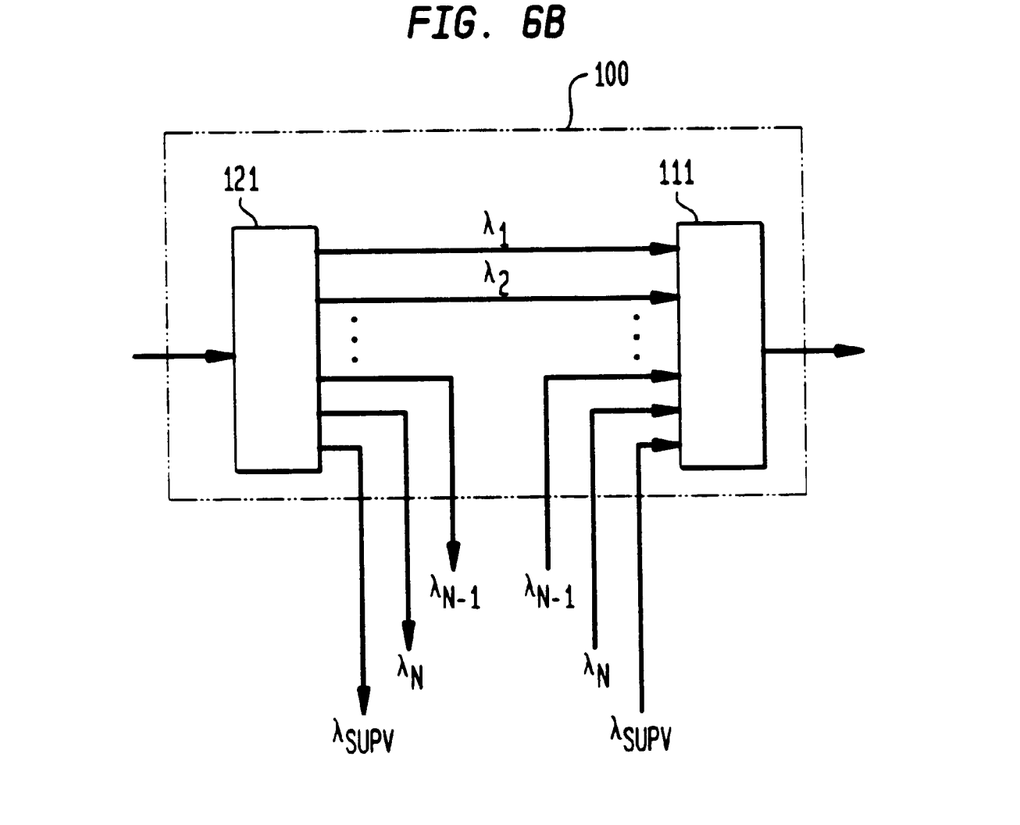
FIG. 6(b) is a detailed schematic diagram of a WGR of the present invention in use with a WDM system configured as a wavelength add/drop site.

Referring to FIG. 6(b), there is shown an exemplary embodiment of the present invention in a WDM system using the new WGR multiplexer/demultiplexer and wavelength add/drop elements. The network element 100 is comprised of a demultiplexer 121 coupled with a multiplexer 111. As can be seen, the multiplexer 111 multiplexes in both the signal WDM channels and the SUPV wavelengths. The demultiplexer 121 demultiplexes both the signal WDM channels and the SUPV wavelengths. It should be noted that the SUPV signal wavelength can be directly coupled between the demultiplexer 121 and multiplexer 111 rather than being dropped and added.

Figure 7:
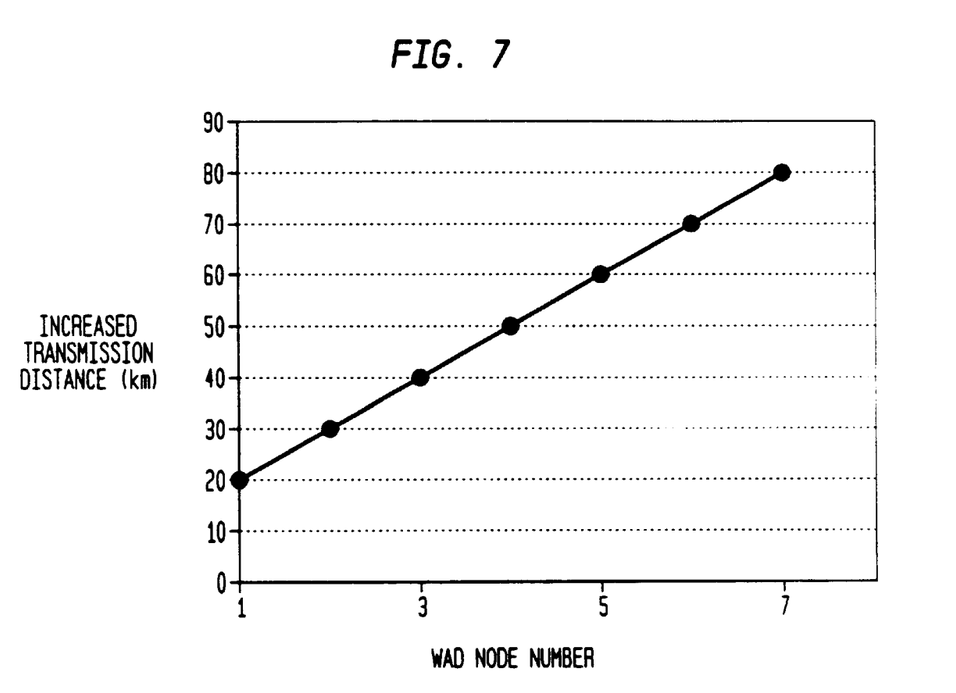
FIG. 7 is a diagram of projected increases in transmission distances as a result of a planar waveguide router in accordance with the present invention.

As an example of increased transmission distance achieved by the present invention, referring to FIG. 7, there is shown in graphical form the results of a projected simulation of increased transmission distance using the WGRs of the present invention in a wavelength add/drop WDM systems. It is assumed that all conditions remain identical from the conventional wavelength add/drop WDM systems. As can be seen, dramatic increases in transmission distance can be achieved by use of the WGR devices of the present invention in a WDM system, where the typical insertion loss for SUPV add/drop filters is about 1.0 dB.

Although the present invention is described in various illustrative embodiments, it is not intended to limit the invention to the precise embodiments disclosed herein. Accordingly, this description is to be construed as illustrative only. Those who are skilled in this technology can make various alterations and modifications without departing from the scope and spirit of this invention. Therefore, the scope of the present invention shall be defined and protected by the following claims and their equivalents. The exclusive use of all modifications within the scope of the claims is reserved.

What is claimed is:

1. An apparatus for routing optical transmission of data signals and out-of-band signals using wavelength division multiplexing, said apparatus comprising:
   a first slab coupler;
   a plurality of input waveguides radially coupled to said first slab coupler;
   an optical grating of unequal length waveguides having inputs and outputs, the inputs coupled to said first slab coupler;
   a second slab coupler coupled to the outputs of said optical grating; and
   a plurality of output waveguides radially coupled to said second slab coupler;
   wherein said input waveguides include ports for inputting the data signals and the out-of-band signals;
   wherein said output waveguides include ports for outputting the data signals and the out-of-band signals; and
   wherein said out-of-band signals have a different signal bandwidth than said data signals.

2. The apparatus of claim 1 wherein at least one of said ports of said input waveguides and at least one of said ports of said output waveguides are assigned to out-of-band signals.

3. The apparatus of claim 2 wherein said input waveguides and said output waveguides assigned to out-of-band signals have different spatial wavelength dispersion characteristics than input waveguides and output waveguides assigned to the data signals.

4. The apparatus of claim 1 wherein one of said out-of-band signals is a supervisory signal.

5. The apparatus of claim 1 wherein one of said out-of-band signals is pilot signal.

6. The apparatus of claim 1 wherein the data signals and the out-of-band signals are kept from interfering by selection of the free spectral range.

7. The apparatus of claim 1 wherein said input waveguides include at least one dummy channel for Vernier tuning.

8. The apparatus of claim 7 wherein said output waveguides include at least one dummy channel for Vernier tuning.

9. The apparatus of claim 8 wherein said at least one dummy channel of the input waveguides is for Vernier tuning of data signals and out-of-band signals.

10. The apparatus of claim 9 wherein said at least one dummy channel of the output waveguides is for Vernier tuning of data signals and out-of-band signals.

11. The apparatus of claim 10 wherein said at least one dummy channel of said input waveguides is balanced by input waveguides around an axis formed by the center input waveguide.

12. The apparatus of claim 11 wherein said at least one dummy channel of said output waveguides is balanced by output waveguides around an axis formed by the center output waveguide.

13. The apparatus of claim 1 wherein said output waveguides assigned to out-of-band signals are tapered waveguides.

14. The apparatus of claim 13 wherein said tapered waveguides are exponentially tapered.

15. The apparatus of claim 13 wherein said tapered waveguides are linearly tapered.

16. An optical interconnection apparatus for routing transmission of data signals and our-of-band signals in a wavelength division multiplexing system, said apparatus comprising:
   a first dielectric slab coupler substantially circular in shape;
   a plurality of input waveguides radially coupled to said first slab coupler;
   an optical grating of unequal length waveguides having inputs and outputs, the inputs coupled to said first slab coupler;
   a second dielectric slab coupler substantially circular in shape, said second coupler coupled to the outputs of said unequal length waveguides; and
   a plurality of output waveguides radially coupled to said second slab coupler; wherein said input waveguides include ports for inputting the data signals and the out-of-band signals;
   wherein said output waveguides include ports for outputting the data signals and the out-of-band signals; and
   wherein said out-of-band signals have a different signal bandwidth than said data signals.

17. The apparatus of claim 16 wherein at least one of said input waveguides and at least one of said output waveguides are assigned to out-of-band signals and said out-of-band signal waveguides have different spatial wavelength dispersion characteristics than input waveguides and output waveguides assigned to the data signals.

18. The apparatus of clam 16 wherein one of said out-of-band signals is a supervisory signal.

19. The apparatus of claim 16 wherein one of said out-of-band signals is a pilot signal.

20. The apparatus of claim 16 wherein the data signals and the out-of-band signals are kept from interfering by proper design of the free spectral range.

21. The apparatus of claim 16 wherein said input waveguides include at least one dummy channel for Vernier tuning.

22. The apparatus of claim 21 wherein said output waveguides include at least one dummy channel for Vernier tuning.

23. The apparatus of claim 22 wherein said at least one dummy channel of the input waveguides is for Vernier tuning of data signals and out-of-band signals.

24. The apparatus of claim 23 wherein said at least one dummy channel of the output waveguides is for Vernier tuning of data signals and out-of-band signals.

25. The apparatus of claim 24 wherein said at least one dummy channel of said input waveguides is balanced by input waveguides around an axis formed by the center input waveguide.

26. The apparatus of claim 25 wherein said at least one dummy channel of said output waveguides is balanced by output waveguides around an axis formed by the center output waveguide.

27. The apparatus of claim 16 wherein said output waveguides assigned to out-of-band signals are tapered waveguides.

28. The apparatus of claim 27 wherein said tapered waveguides are exponentially tapered.

29. The apparatus of claim 27 wherein said tapered waveguides are linearly tapered.

30. An apparatus for routing transmission of data signals and out-of-band signals in a wavelength division multiplexing system, said apparatus comprising:
- a wavelength demultiplexer element including
  - a first slab coupler;
  - a plurality of input waveguides radially coupled to said first slab coupler;
  - an optical grating of unequal length waveguides having inputs and outputs, the inputs coupled to said first slab coupler;
  - a second slab coupler coupled to the outputs of said optical grating; and
  - a plurality of output waveguides radially coupled to said second slab coupler;
- a wavelength multiplexer element including
  - a first slab coupler;
  - a plurality of input waveguides radially coupled to said first slab coupler, said input waveguides coupled to at least one of said output waveguides of said wavelength demultiplexer element;
  - an optical ganting of unequal length waveguides having inputs and outputs, The inputs coupled to said first slab coupler;
  - a second slab coupler coupled to the outputs of said optical grating; and a plurality of output waveguides radially coupled to said second slab coupler;
- wherein said input waveguides of said wavelength demultiplexer element include waveguides for inputing the data signals and at least one waveguide for inputting the out-of-band signals;
- wherein said output waveguides of wavelength multiplexer element include waveguides for outputting the data signals and at least one waveguide for outputting the out-of-band signals; and
- wherein said out-of-band signals have a different signal bandwidth than said data signals.

31. The apparatus of claim 30 wherein one of said out-of-band signals is a supervisory signal.

32. The apparatus of claim 30 wherein one of said out-of-band signals is a pilot signal.

33. The apparatus of claim 30 wherein the data signals and the out-of-band signals are kept from interfering by selection of the free spectral range.

34. The apparatus of claim 30 wherein said input waveguides of said wavelength demultiplexer element include at least one dummy channel for Vernier tuning.

35. The apparatus of claim 34 wherein said output waveguides of said wavelength multiplexer element include at least one dummy channel for Vernier tuning.

36. The apparatus of claim 30 wherein at least one of said output waveguides of said wavelength multiplexer are assigned to out-of-band signals and said out-of-band signal waveguides are tapered waveguides.

37. The apparatus of claim 36 wherein said tapered waveguides are exponentially tapered.

38. The apparatus of claim 36 wherein said tapered waveguides are linearly tapered.

* * * * *